United States Patent
Wang

(10) Patent No.: US 10,071,336 B1
(45) Date of Patent: Sep. 11, 2018

(54) GAS PURIFICATION GETTER CONSTRUCTION FOR AIRBORNE AND SPACE APPLICATIONS

(71) Applicant: NORTHROP GRUMMAN SYSTEMS CORPORATION, Falls Church, VA (US)

(72) Inventor: Ge Wang, Los Alamitos, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 130 days.

(21) Appl. No.: 15/414,502

(22) Filed: Jan. 24, 2017

(51) Int. Cl.
*B01D 53/04* (2006.01)
*B01J 20/02* (2006.01)

(52) U.S. Cl.
CPC ...... *B01D 53/0407* (2013.01); *B01J 20/0207* (2013.01); *B01J 20/0211* (2013.01); *B01J 20/0214* (2013.01); *B01J 20/0225* (2013.01); *B01D 2253/1122* (2013.01); *B01D 2259/4575* (2013.01)

(58) Field of Classification Search
CPC ........ B01D 53/0407; B01D 2253/1122; B01D 2259/4575; B01J 20/0207; B01J 20/0211; B01J 20/0214; B01J 20/0225
USPC .......................................... 96/137, 147, 149
See application file for complete search history.

(56) References Cited

U.S. PATENT DOCUMENTS

| | | | | |
|---|---|---|---|---|
| 3,046,717 A | * | 7/1962 | Northrup | B01D 46/10 55/320 |
| 4,294,699 A | * | 10/1981 | Herrmann | B01J 47/022 210/263 |
| 5,968,468 A | | 10/1999 | Succi et al. | |
| 6,017,502 A | | 1/2000 | Carrea et al. | |
| 6,162,403 A | * | 12/2000 | Foster | F01N 3/28 422/173 |
| 6,689,194 B2 | | 2/2004 | Pratt et al. | |
| 7,431,837 B2 | * | 10/2008 | Cohee | A61L 2/0035 100/116 |
| 2016/0023157 A1 | * | 1/2016 | Matthias | B01D 53/053 95/97 |

FOREIGN PATENT DOCUMENTS

| | | |
|---|---|---|
| EP | 0 470 936 A1 | 2/1992 |
| GB | 2 177 079 A | 1/1987 |

\* cited by examiner

*Primary Examiner* — Frank M Lawrence, Jr.
(74) *Attorney, Agent, or Firm* — John A. Miller; Shumaker, Loop & Kendrick, LLP

(57) ABSTRACT

A gas purification getter for purifying a gas. The getter includes a canister having a cylinder body including a corrugated wall, an inlet end cap coupled to an inlet end of the cylinder body and an outlet end cap coupled to an outlet end of the cylinder body so that the cylinder body, the inlet end cap and the outlet end cap define a sealed chamber. The getter also includes a powder bed of a getter material provided within the chamber so that a flow of the gas from the inlet end to the outlet end is purified by the getter material. Voids in the powder bed when the canister is horizontally oriented are limited to raised portions in the corrugated wall so that there is no short circuit path for the gas to flow from the inlet end to the outlet end.

20 Claims, 3 Drawing Sheets

GAS PURIFICATION GETTER CONSTRUCTION FOR AIRBORNE AND SPACE APPLICATIONS

BACKGROUND

Field

This invention relates generally to a gas purification getter and, more particularly, to a gas purification getter including a corrugated canister in which a getter powder is provided, where the corrugations in the canister prevent short circuit paths through the canister when the canister is positioned horizontally.

Discussion

Various machines and processing apparatus, for example, cryocoolers, fuel cell systems, etc., require an extremely high purity processing gas. However, as a result of various conditions, such as component out-gassing, cross-contamination of storage tanks and delivery lines, filters, gas regulators, valves, meters, etc., the gas composition at the point of use is often not of a sufficiently high enough purity for the intended application especially as the machines age. Typical contaminants in a high purity gas include moisture, hydrocarbons, oxygen, etc.

In-line gas purification getters are often used to provide in-situ, gas purification to ensure that the machine functions properly with the required gas purity. An in-line gas purification getter typically includes a cylindrical canister filled with a getter material, where the canister is made of a high grade stainless steel that is hermetically sealed with precision welds. Micro-scale particle screens are provided inside the canister to allow the gas to pass through from an input port to an output port, but prevent the getter material from escaping the canister. The getter material purifies the gas through complex physical and chemical interactions with the gas and removes contaminants from the gas. Modern getter materials include active metals or metals with extremely high solubility of various gaseous impurities. Often precious metals, such as palladium and platinum, reactive metals, such as titanium, vanadium and niobium, and rare-earth metals, such as lanthanum, are made into inter-metallic compounds for the getter material. These compounds are mechanically weak, and as such the getter material is mostly made in a powder form.

The getter powder is packed into the canister and inlet and outlet ports are welded to the end caps of the canister. However, the powder bed cannot practically be packed to a 100% fill factor because of the presence of the particle retention screens and the welded end caps. Further, the microscopic powder configuration during service is different from the powder configuration during the factory acceptance test. This condition is worsened if the powder fill factor in the canister is less than 100%, or the mismatch between the thermal expansion coefficients of the powder and the canister allows the volume of the canister to slightly expand during service. The powder inside of the canister is able to move around especially after temperature excursions and mechanical vibrations that cause relative motion between the powder and the canister. Further, each time the getter is re-situated or re-oriented, the powder moves either due to gravity or relative motion between the powder particles. Therefore, a powder-free space occurs at the top of the cylinder, either at one of the end caps if the canister is held vertically, or at the curved canister wall if the canister is held horizontally. Thus, the horizontal position of the canister can result in a short circuit path around the getter powder bed, where the gas can flow through the canister without flowing through the powder.

A certain amount of pressure is necessary so that the gas flows through the powder so that it is purified. In some designs, the particles in the powder have an irregular shape to allow the gas to more easily flow therethrough. However, the short circuit path offers a lower resistance flow for the gas, which causes the gas to flow through the short circuit path instead of through the powder. Thus, these short circuit paths significantly reduce the gas purification ability of the getter. Therefore, some getter manufacturers recommend that the getter be mounted vertically to avoid powder bed short circuits from forming during service. However, for gas systems installed on a moving platform, such as an aircraft or spacecraft, there is no assurance that a gas purification getter will remain at the desired vertical mounting orientation.

To overcome the short circuit problem the getter particles in the powder may be glued or micro-welded together so that movement of the particles becomes restricted. However, adhesive bonding and other joining methods introduce polymeric materials and low melting metals that can become contaminants to the gas and poisons to the getter material. Further, one or both sides of the getter end caps can be moveable where one or more springs are compressed and mechanically fastened at the powder bed. However, this introduces complexity into the construction of the getter, and if the spring material is not made of stainless steel, may become a source of contamination.

Alternately, the powder bed can be magnetized if the getter powder material can be alloyed and made to become ferromagnetic, where strong permanent magnets can be employed to orient the powder bed so that the short circuit channels within the powder bed do not reconfigure themselves under Earth's gravity when the getter moves with a dynamic platform, such as an aircraft or spacecraft. This solution is based on the premise that the getter material is ferromagnetic or can be made such which in turn greatly restricts the choices of getter materials for maximizing its gas impurity removing effectiveness. In addition, a strong permanent magnetic field is a source of interference to other sensitive on-board systems, such as navigation and attitude control systems.

DETAILED DESCRIPTION OF THE EMBODIMENTS

The following discussion of the embodiments of the invention directed to gas purification getter including a corrugated canister is merely exemplary in nature, and is in no way intended to limit the invention or its applications or uses.

As will be discussed in detail below, the present invention proposes a gas purification getter that includes a corrugated cylindrical canister that reduces or eliminate short circuit paths around a getter powder bed. By this design, the getter maintains the simplicity of known designs, introduces no new materials or restrictions to getter powder movement, and maximizes the usefulness of the getter. When the canister is placed horizontally, a small, powder-free space forms at the top of the canister. However, unlike a straight canister, the corrugated canister breaks down the powder-free space into several isolated compartments. As such, a continuous short circuit does not form in the canister. The gas flow is forced into the getter powder bed to ensure effective impurity removal.

In one embodiment, a further reduction in the volume of the powder-free space in the getter powder bed is provided. In this construction, a thin-wall corrugated canister is placed inside a straight thick wall housing with either a spring or several threaded fasteners located on the end caps of the straight housing. After installation, the spring force or the thread fasteners push on the end caps of the corrugated canister. Because of the flexible thin wall of the corrugated canister the powder bed volume is compressed under the external force. Even though the powder bed might have been loosely packed initially, the final adjustment by the spring load or the fasteners ensures the packing factor of the powder bed to be close to 100%. Therefore, the corrugated canister allows an extra degree of geometric blockage and adjustment of the getter powder bed that a straight canister is critically lacking. For space applications where there is no gravity-biased accumulation of a powder-free space, some micro-channels may still develop in the powder bed, and a thin wall construction of the canister is then preferred in this case.

Figure 1:
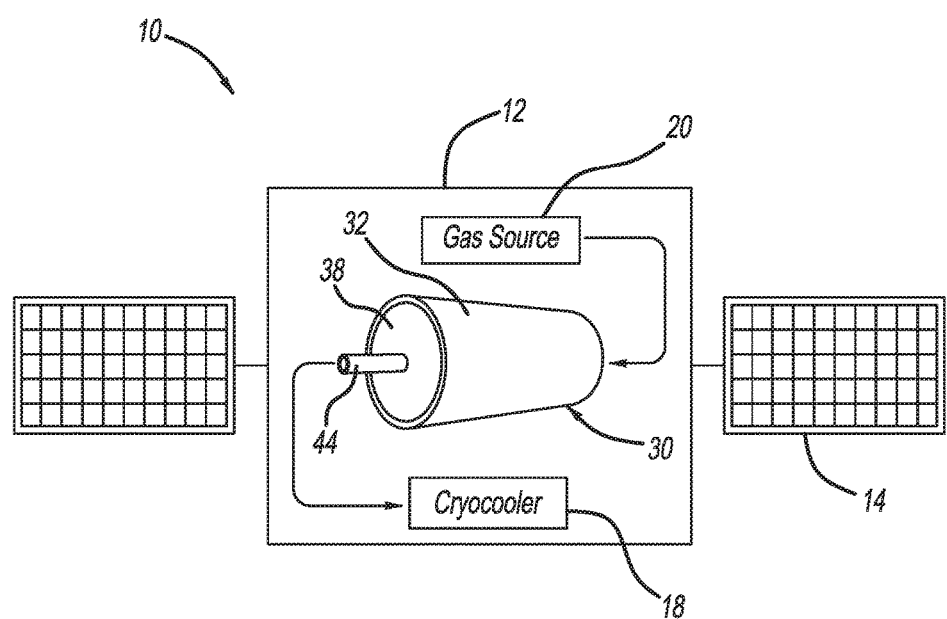
FIG. 1 is an illustration of a spacecraft including a known gas purification getter having a straight canister.

FIG. 1 is an illustration of a spacecraft 10 including a spacecraft body 12 and solar array panels 14. A cryocooler 18 is provided on the spacecraft body 12 and may have various applications, such as cooling infrared sensors and detectors (not shown) to make them more sensitive and reduce self-induced noise. In one known cryocooler design, helium gas is used as a cooling medium or working fluid in the cryocooler 18 to convert electrical energy into thermal cooling power. A gas source 20 provided on the spacecraft body 12 that stores the helium gas. As discussed above, the helium gas needs to have a very high purity for this application, and thus a gas purification getter 30 receives and purifies the gas from the gas source 20 prior to it being provided to the cryocooler 18, as shown.

Figure 2:
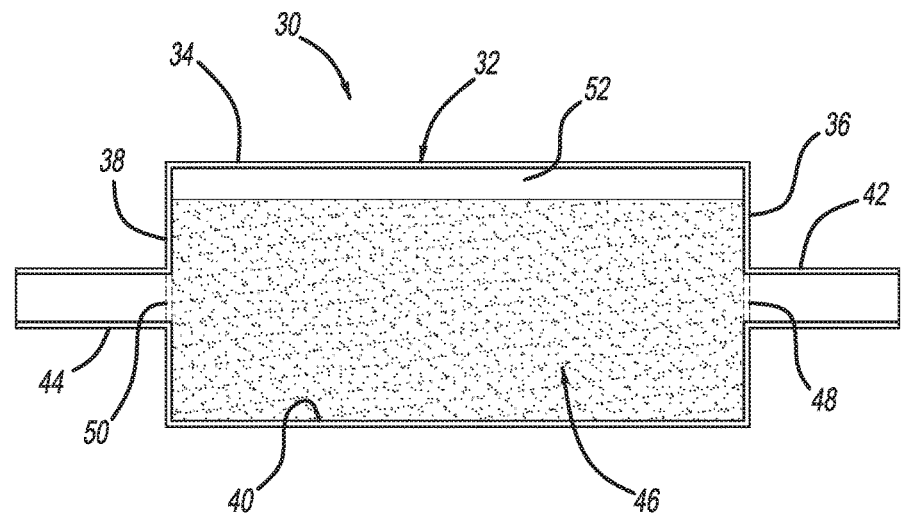
FIG. 2 is a cross-sectional view of the gas purification getter shown in FIG. 1.

FIG. 2 is a cross-sectional view of the gas purification getter 30, which is of a known design. The getter 30 includes a canister 32 having a straight-line cylindrical body 34, an inlet end cap 36 and an outlet end cap 38 defining a hermetically sealed chamber 40. An inlet gas port 42 is coupled to the inlet end cap 36 and an outlet gas port 44 is coupled to the outlet end cap 38. A suitable getter material, for example, a getter powder bed 46, is provided in the chamber 40 prior to the chamber 40 being sealed in a manner well understood by those skilled in the art. The gas to be purified is introduced into the chamber 40 through the inlet port 42 under an appropriate pressure, flows through the powder bed 46 where contaminants are removed from the gas and absorbed into the bed 46, and exits the chamber 40 through the outlet port 44. An inlet screen 48 is provided in the chamber 40 proximate the inlet port 42 and an exit screen 50 is provided in the chamber 40 proximate the outlet port 44 that prevent powder in the powder bed 46 from flowing out of the canister 32. The length and diameter of the canister 32 would be optimized for the particular application and gas.

The canister 32 is depicted in a horizontal configuration to show that for the reasons discussed above a void 52 is created in the chamber 40, which creates a low resistance short-circuit flow path from the inlet port 42 to the outlet port 44 that the gas will tend to flow through. Because the gas minimally interacts with the powder in the powder bed 46 when flowing through the void 52 it may not be purified enough for the desired use.

Figure 3:
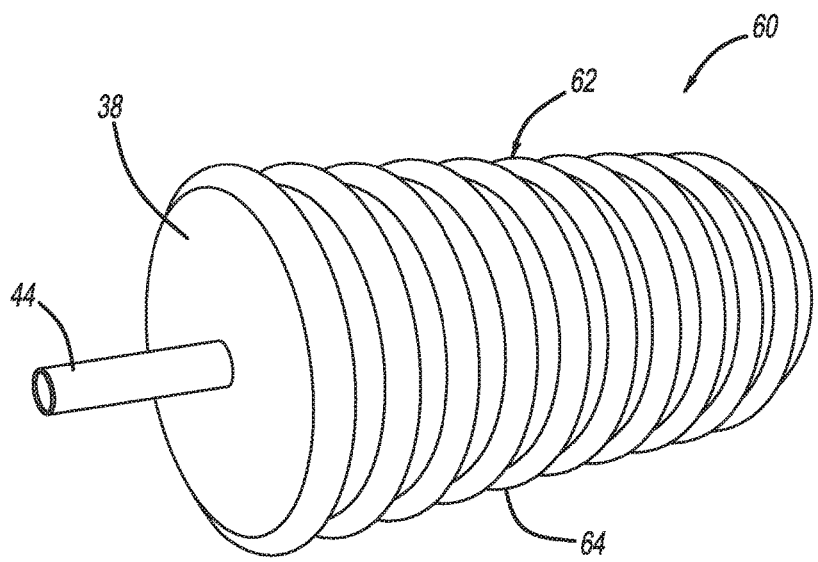
FIG. 3 is an isometric view of a gas purification getter including a corrugated canister.
Figure 4:
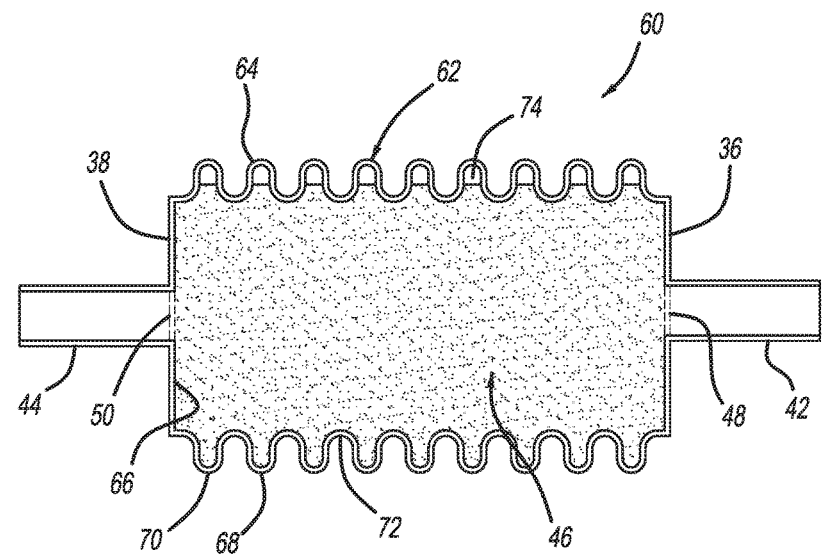
FIG. 4 is a cross-sectional view of the gas purification getter shown in FIG. 3.

FIG. 3 is an isometric view and FIG. 4 is a cross-sectional view of a gas purification getter 60 that solves the above-described problem, where like elements to the getter 30 are identified by the same reference number. In this embodiment, the canister 32 having the straight-line cylindrical body 34 is replaced with a canister 62 having a corrugated cylindrical body 64 and defining a chamber 66 therein. The corrugated body 64 has a corrugated wall 68 defined by raised portions 70 and lower portions 72. The canister 62 has roughly the same volume as the canister 32, where the same amount of the powder is provided in the powder bed 26. Thus, the same open volume as the void 52 is caused to occur in the chamber 66. However, because of the corrugated wall 68, when the getter 60 is oriented horizontally, voids 74 are created within the raised portions 70 at an upper location of the canister 62, as shown, that do not extend below the lower portions 72. Thus, there is not a continuous short circuit path from the inlet port 42 to the outlet port 44 through which the gas can flow. Therefore, all of the gas is purified by the powder bed 46.

It is noted that in this non-limiting embodiment, the corrugations in the wall 68 are provided by a sinusoidal feature having a certain pitch. This is by way of a non-limiting example in that other corrugated configurations may also be equally applicable. For example, the corrugations can be defined by triangular shaped portions, square shaped portions, etc., where the shape of the canister, the size of the canister, the manufacturing processes employed, the materials employed, etc., may dictate what type of corrugations are best.

Figure 5:
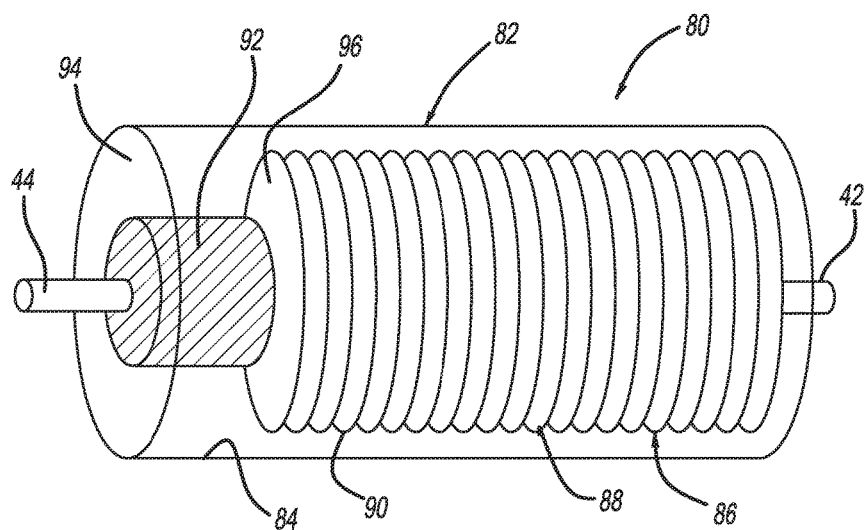
FIG. 5 is an isometric view of a gas purification getter including a corrugated canister within a straight-line outer housing.

Another embodiment was mentioned above where the volume of the canister is reduced after it is filled with the powder so as to limit or remove the short circuit paths and voids therein. FIG. 5 is an isometric line drawing of a gas purification getter 80 depicting this embodiment, where like elements to the getter 30 are identified by the same reference number. In this embodiment, the getter 80 includes an outer straight-line cylindrical housing 82 defining a housing chamber 84 that provides the structural integrity of the getter 80 that is desired for the particular application. A corrugated getter canister 86 is provided within the chamber 84, and includes a corrugated wall 88 similar to the corrugated wall 68. In this design, the canister 86 does not provide structural rigidity for the getter 80, and thus the canister 86 can have a thinner wall and/or be made of a less rigid material, such as aluminum. Corrugations 90 in the wall 88 thus cause the canister 86 to be more flexible than if the canister 86 provided structural rigidity so that the canister 86 can be compressed. Compressing the canister 86 after the powder bed 46 is provided therein causes the voids that may occur in the canister 86 to be reduced or eliminated.

Any suitable technique can be used for compressing the canister 86. In this embodiment, a spring 92 is provided between an end cap 94 of the housing 82 and an end wall 96 of the canister 86 within the chamber 84 that causes the canister 86 to be compressed. As the getter 80 rotates or is otherwise moved by vibration, shock or gravitational forces, where larger voids in the canister 86 are created, compression of the spring 92 causes those voids to not be generated. Although the spring 92 is shown at an outlet end of the canister 86, it is within the scope of the invention to provide the spring 92 in the same configuration at the inlet end of the canister 86.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A gas purification getter for purifying a gas, said getter comprising:
    a canister including a canister body having a corrugated wall, an inlet end cap coupled to an inlet end of the canister body and an outlet end cap coupled to an outlet end of the canister body so that the canister body, the inlet end cap and the outlet end cap define a sealed getter chamber; and
    a getter material provided within the getter chamber so that a flow of the gas from the inlet end to the outlet end is purified by the getter material, wherein voids in the getter material when the canister is horizontally oriented are limited to raised portions in the corrugated wall so that there is no short circuit path for the gas to flow from the inlet end to the outlet end.

2. The getter according to claim 1 wherein the getter material is a powder.

3. The getter according to claim 1 wherein the canister is stainless steel.

4. The getter according to claim 1 wherein corrugations in the corrugated wall are sinusoidal corrugations.

5. The getter according to claim 1 wherein the getter chamber is hermetically sealed.

6. The getter according to claim 1 wherein the canister is cylindrical.

7. The getter according to claim 1 further comprising an outer getter housing defining a housing chamber therein, said canister being positioned within the housing chamber and being axially aligned therewith, said canister being a flexible canister that is compressible so as to reduce the volume of the getter chamber as the canister is compressed.

8. The getter according to claim 7 wherein the canister is compressed under a spring force provided by a spring within the housing chamber and being positioned against one of the inlet end cap or the outlet end cap and an end wall of the housing.

9. The getter according to claim 1 wherein the getter material is selected from the group consisting of palladium, platinum, titanium, vanadium, niobium and lanthanum.

10. The getter according to claim 1 wherein the getter is part of a cryocooler.

11. The getter according to claim 10 wherein the cryocooler is on a spacecraft.

12. A gas purification getter for purifying a gas, said getter comprising:
    a cylindrical canister including a canister body having a sinusoidal-shaped corrugated wall, said canister further including an inlet end cap coupled to an inlet end of the canister body and an outlet end cap coupled to an outlet end of the canister body so that the canister body, the inlet end cap and the outlet end cap define a sealed getter chamber; and
    a getter powder bed provided within the getter chamber so that a flow of the gas from the inlet end to the outlet end is purified by the getter material, wherein voids in the powder bed when the canister is horizontally oriented are limited to raised portions in the corrugated wall so that there is no short circuit path for the gas to flow from the inlet end to the outlet end.

13. The getter according to claim 12 wherein the canister is stainless steel.

14. The getter according to claim 12 wherein the getter material is selected from the group consisting of palladium, platinum, titanium, vanadium, niobium and lanthanum.

15. The getter according to claim 12 wherein the getter is part of a cryocooler.

16. The getter according to claim 15 wherein the cryocooler is on a spacecraft.

17. A gas purification getter for purifying a gas, said getter comprising:
    a cylindrical outer housing defining a housing chamber therein;
    a cylindrical canister axially positioned within the housing chamber, said canister including a canister body having a corrugated wall, an inlet end cap coupled to an inlet end of the canister and an outlet end cap coupled to an outlet end of the canister body so that the canister body, the inlet end cap and the outlet end cap define a hermetically sealed getter chamber; and
    a getter powder bed provided within the getter chamber so that a flow of the gas from the inlet end to the outlet is purified by the getter powder, wherein voids in the powder bed when the canister is horizontally oriented are limited to raised portions in the corrugated wall so that there is no short circuit path for the gas to flow from the inlet end to the outlet end.

18. The getter according to claim 17 wherein the canister is compressed under a spring force provided by a spring within the housing chamber and being positioned against one of the inlet end cap or the outlet end cap and an end wall of the housing.

19. The getter according to claim 17 wherein the getter is part of a cryocooler.

20. The getter according to claim 19 wherein the cryocooler is on a spacecraft.

* * * * *